Patented May 25, 1948

2,442,212

UNITED STATES PATENT OFFICE 2,442,212

METHOD OF PREPARING ORGANO-SILICON RESIN

Eugene G. Rochow, Schenectady, N. Y., assignor to General Electric Company, a corporation of New York No Drawing. Original application May 16, 1941, Serial No. 393,843. Divided and this application October 19, 1945, Serial No. 623,449

1 Claim. (Cl. 260—46.5)

This invention relates to new compositions of matter. More particularly the invention is concerned with new and useful organo-silicon resinous materials and with a method of preparing the same.

This application is a division of my copending application Serial No. 393,843 filed May 16, 1941, now abandoned, which in turn is a continuation-in-part of my copending application Serial No. 287,787, filed August 1, 1939, (now Patent 2,258,218) and of my copending applications Serial Nos. 332,097, 332,098 and 332,099, filed April 27, 1940 (now respectively issued as Patents 2,258,220, 2,258,221 and 2,258,222), all of which applications are assigned to the same assignee as the present invention.

In my copending application Serial No. 287,787 directed to methyl silicones and related products, I disclosed that when it is desired to copolymerize mixtures of compounds having a particular ratio of methyl groups to silicon in the molecule of each individual compound, this may be accomplished by mixing suitable proportions of, for example, mono- and di-methyl silicon chlorides, hydrolyzing the mixture and dehydrating the resulting product. I also disclosed in copending application Serial No. 332,098 directed to aroxy silicones that when it is desired to copolymerize mixtures of compounds having a particular ratio or aroxyaryl or aroxyalkyl groups to silicon in the molecule of each individual compound this may be done by mixing suitable proportions of, for example, mono- and di-(phenoxyphenyl) silicon chlorides, hydrolyzing the mixture and dehydrating the resulting product. Similar disclosures were made in copending applications Serial Nos. 332,097 and 332,099 relating to other organo-silicon compounds.

It is an object of the present invention to provide an economical and practical method for the production of organo-silicon resinous materials of a predetermined composition from (1) mixtures containing a plurality of different organo-silicon halides, more particularly from mixtures containing an organo-silicon halide having the formula (A) $(R)_n Si(X)_{4-n}$ and an organo-silicon halide having the formula (B) $(R')_n Si(X)_{4-n}$ in which formulas R represents a methyl radical and R' represents a phenyl radical, X represents halogen and $n$ is a whole number and is at least 1.

It is a further object of the invention to provide a method whereby organo-silicon resinous materials of a desired over-all composition and of desired properties can be obtained with minimum variation in composition and in properties from batch to batch, that is, with better control and reproducibility than heretofore has been possible.

Another object of my invention is to provide an economical method of preparing organo-silicon resins containing a high content of silicon and oxygen in the polymeric structure.

Still another object of my invention is the production of new and useful organo-silicon resinous compositions, more particularly products obtained by dehydrating hydrolyzed mixtures containing organo-silicon halides which, if hydrolyzed separately, would yield non-condensable oils or insoluble solids of little or no commercial utility.

In carrying my invention into effect I first prepare a mixture of organo-silicon halides consisting of at least one methyl silicon halide and at least one phenyl silicon halide. The mixture is hydrolyzed. The resulting hydrolysis products are converted to the resinous state by dehydrating the same, as by heating, in the presence or absence of a dehydrating agent, numerous examples of which are given in my copending application Serial No. 332,605, filed April 30, 1940 (now Patent 2,371,068), and assigned to the same assignee as the present invention.

I am unable to state with certainty the reactions involved when mixtures containing the two or more different organo-silicon halides, or mixtures containing such organo-silicon halides and also at least one silicon halide, are hydrolyzed and then dehydrated, as by heating. However, it is probable that the halides hydrolyze separately to give the corresponding silicols, and that these mixed silicols then interact (copolymerize and cocondense) to give higher molecular weight bodies constituting the organo-silicon resinous composition.

By suitably proportioning the starting materials, the degree of cocondensation and interlinking can be controlled to give a polymer of the desired properties. A few percent of silicon tetrachloride added before hydrolysis ordinarily is effective in accelerating the hardening of an organo-silicon resinous material of this invention, and even the addition of as little as 1% may have a perceptible effect. On the other hand it may be desirable in some cases, particularly those in which liquid products difficult to condense to the solid condition are anticipated, to add amounts of silicon tetrachloride as high as 20 or 25% to the organo-silicon halide or halides before hydrolysis. As the amount of silicon tetrachloride in the hydrolysis mixture is increased, the tendency for silicic acid molecules to condense with like molecules is correspondingly increased, thereby imposing an upper limit on the amount of silicon tetrachloride which advantageously may be so employed without the precipitation of substantial amounts of hydrous silica.

This postulated theory is one possible explanation of the observed facts. However, it is possible to postulate a different mechanism, namely, one based on the assumption that the halides interact with the hydroxy compounds. Such reactions might take place simultaneously with the hydrolysis and condensation reactions of the silicols as in the first-mentioned hypothesis.

Whatever the correct mechanism of the reaction may be, the fact remains that the present invention provides means for the production of organo-silicon resins having, from batch to batch, substantially the same desired composition and properties. The technique of this invention avoids the difficulties encountered in preparing a "mixed" methyl phenyl silicone by first forming methyl silicon chlorides in solution and then causing phenyl groups to be attached to some or all of the silicon atoms already linked to methyl groups.

My invention also makes possible the production of a less costly organo-silicon resin containing a high content of silicon and oxygen, since substantial amounts of relatively inexpensive material, e. g., silicon tetrachloride, can be used in its production. Furthermore, the invention provides a means for preparing organo-silicon resinous materials from mixtures containing organo-silicon halides which, if hydrolyzed separately, are extremely difficult or impossible to convert into resinous products by heat alone. These are new and unexpected results that in no way could have been predicted from the known properties of organo-silicon halides or from the properties of the hydrolysis products of such halides.

In order that those skilled in the art better may understand how the present invention may be carried into effect, the following illustrative examples thereof are given:

Example 1

One-tenth (0.1) mol of dimethyl silicon dichloride, $(CH_3)_2SiCl_2$, and 0.1 mol of phenyl silicon trichloride, $C_6H_5SiCl_3$, were mixed, dissolved in ether and hydrolyzed by pouring upon ice. The ether solution was separated, washed and evaporated, leaving partial condensation products of the hydrolysis products of the mixed organo-silicon halides. The residual reaction product was heated for 24 hours at 150° C., yielding a viscous liquid which formed a sticky resin when cooled to room temperature. Additional heating for 4 hours at 220° C. resulted in a tough, somewhat thermoplastic resin containing an average of approximately one methyl group and 0.5 phenyl group per silicon atom.

Example 2

One-tenth (0.1) mol of dimethyl silicon dichloride, 0.08 mol of phenyl silicon trichloride and 0.02 mol of diphenyl silicon dichloride were mixed, hydrolyzed and further treated as described under Example 1. The resulting copolymer was a liquid mass after heating for 24 hours at 150° C. but was converted into a soft resin by heating for an additional 4 hours at 220° C. This soft resin hardened upon further heating.

Example 3

This example illustrates the preparation of an organo-silicon resinous material which is the dehydrated product of hydrolysis of a mixture containing the following components in approximately the stated molar ratios: 1 mol of dimethyl silicon dichloride, 0.6 mol of phenyl silicon trichloride and 0.4 mol of diphenyl silicon dichloride.

One-tenth (0.1) mol of dimethyl silicon dichloride, 0.06 mol of phenyl silicon trichloride and 0.04 mol of diphenyl silicon dichloride were mixed and hydrolyzed as described under Example 1. Heating the hydrolyzed mixture for 24 hours at 150° C. and for an additional 4 hours at 220° C. yielded a sticky resinous mass, which was converted to a solid resin upon heating for 24 hours more at 220° C.

Example 4

One-tenth (0.1) mol of dimethyl silicon dichloride, 0.04 mol of phenyl silicon trichloride and 0.06 mol of diphenyl silicon dichloride were mixed and hydrolyzed as described under Example 1. The product was a viscous liquid after heating for 24 hours at 150° C. and for an additional 4 hours at 220° C. A solid copolymer was obtained after heating for several days at 220° C.

Example 5

One-tenth (0.1) mol of dimethyl silicon dichloride, 0.02 mol of phenyl silicon trichloride and 0.08 mol of diphenyl silicon dichloride were mixed and hydrolyzed as described under Example 1. The product increased slowly in viscosity upon heating at 220° C., gradually curing to a solid state after heating for a few weeks at 200° C.

It will be understood, of course, by those skilled in the art that my invention is not limited to the use of the specific reactants named in the above illustrative examples. From the examples, it will be apparent that I may use a mixture containing an organo-silicon halide or halides having the general formula (C) $\qquad (R)_n Si(X)_{4-n}$ where R is a methyl radical, X is halogen, e. g., chlorine, bromine, etc., and $n$ is a whole number and is at least 1 and not more than 2, and, in addition to said halide or halides represented by Formula C, any organo-silicon halide or halides having the general formula (D) $\qquad (R')_n Si(X)_{4-n}$ where X and $n$ have the same meanings as described above with reference to Formula C and R' is a phenyl radical. Products of particular value in the electrically insulating art are obtained by hydrolyzing and dehydrating a mixture containing a methyl silicon halide, specifically the chloride, and a phenyl silicon halide, more particularly the chloride; also by hydrolyzing and dehydrating mixtures containing a methyl silicon halide, a phenyl silicon halide and a silicon tetrahalide.

The proportions of starting reactants may be varied considerably depending upon the particular properties desired in the end-products. If, for purposes of economy or to improve the properties of the final product, it should be desirable to use mixtures of dimethyl silicon dihalides and diphenyl silicon dihalides, it is advantageous to incorporate from 1 to 25% of silicon tetrahalide, specifically silicon tetrachloride, into the mixture before hydrolysis in order that the hydrolysis products more readily may be condensed to a solid resinous condition. When methyl silicon chloride and phenyl silicon chloride constitute the starting reactants, good results are obtained when these reactants are used in such proportions as to result in an average ratio of from 0.5 to 1.5 methyl groups per silicon atom and an average ratio of from 0.5 to 1.0 phenyl groups per silicon atom. In order to obtain resinous solids from the hydrolysis products within a convenient time, by heat alone, it is desirable that the average ratio of combined methyl and phenyl groups per silicon atom be from 1 to 2.

The products of this invention, which may be described more specifically as copolymerization or cocondensation products of the hydroxy derivatives of the mixed starting halides, may be modified with fillers, plasticizers, other resinous materials both natural and synthetic, and other addition agents such as disclosed, for example, in my above-identified copending applications. These addition agents may be incorporated into the compound prior to, during or after the copolymerization and cocondensation reactions have been effected. The products of this invention are suitable for use in electrically insulating and other applications such as described in the above-mentioned copending cases.

What I claim as new and desire to secure by Letters Patent of the United States is:

The method of preparing an organo-silicon resinous material which comprises forming an ether solution of a mixture of organo-silicon halides consisting of 1 mol dimethyl silicon dichloride, 0.6 mol phenyl silicon trichloride, and 0.4 mol diphenyl silicon dichloride, hydrolyzing said organo-silicon halides by pouring said solution upon ice, recovering the ether solution of the hydrolysis products, evaporating the ether solvent, and heating the residual hydrolysis products at a temperature of 150° C. for 24 hours and for an additional 4 hours at 220° C. to obtain a sticky resinous mass which upon further heating can be converted to a solid resin.

EUGENE G. ROCHOW.

REFERENCES CITED

The following references are of record in the file of this patent:

UNITED STATES PATENTS

| Number | Name | Date |
|---|---|---|
| 2,258,222 | Rochow | Oct. 7, 1941 |
| 2,386,466 | Hyde | Oct. 9, 1945 |

OTHER REFERENCES

Kipping, Tr. J. Chem. Soc. London, vol. 101 (1912), pp. 2108, 2113, and 2114.